Dec. 9, 1947.                J. A. SCHAEFFER                2,432,253
            SWIVELLING FRONT WHEEL ASSEMBLY FOR WAGONS OR TRAILERS
                              Filed Dec. 8, 1945
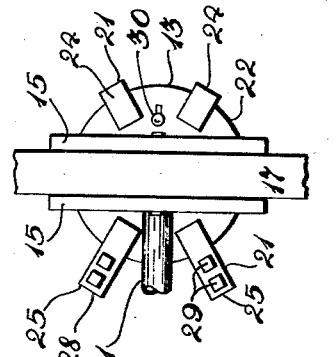
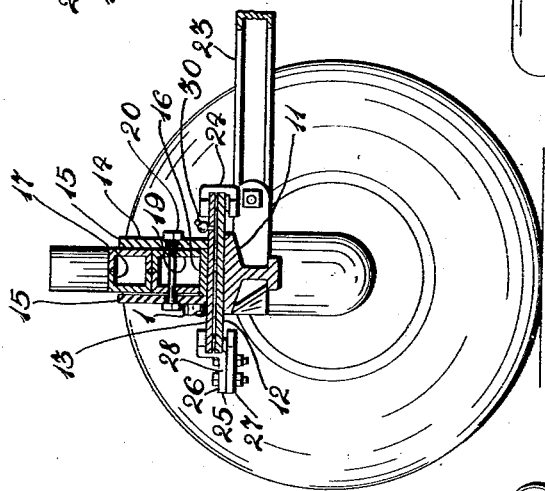
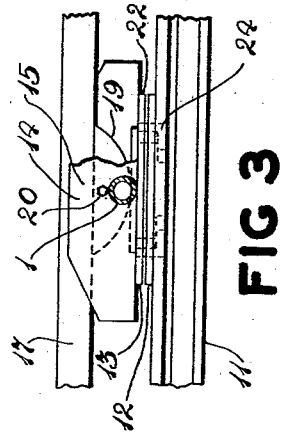
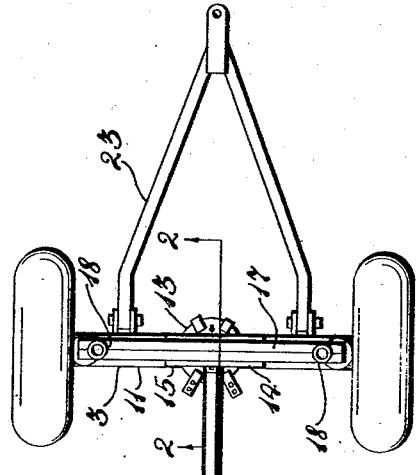
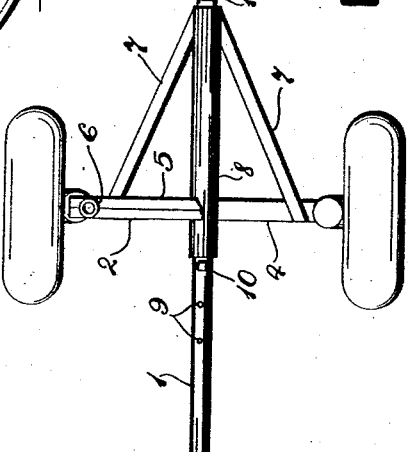
INVENTOR:
Joseph A. Schaeffer
his Atty's.

Patented Dec. 9, 1947

2,432,253

UNITED STATES PATENT OFFICE 2,432,253

SWIVELLING FRONT WHEEL ASSEMBLY FOR WAGONS OR TRAILERS

Joseph A. Schaeffer, Winnipeg, Manitoba, Canada, assignor to Auto Wrecking Company Limited, Winnipeg, Manitoba, Canada Application December 8, 1945, Serial No. 633,787

4 Claims. (Cl. 280—116)

My invention relates to a swivelling wagon or trailer gear, an object of the invention being to provide front and rear wheel assemblies of the character herewithin described by means of which free vertical swivelling of the front and rear assemblies may be attained without stress or torsion upon the box, in accordance with undulations in the road over which the device is travelling.

A further object of the present invention resides in the provision of a cylindrical reach, and a rear wheel assembly which includes a sleeve secured at right angles to the rear wheel axle beam, which sleeve is free for at least limited vertical rotation about the reach, means being also provided for longitudinal adjustment of the said rear wheel assembly upon the length of the reach.

A further object of the present invention consists in the provision of a box-carrying bolster on either the front or back wheel assemblies so mounted with respect to the subjacent axle beam as to possess freedom for limited vertical rotation whereby the above said stress and torsion may be eliminated, and such mounting of the bolster may if desired be resorted to upon both front and rear wheel assemblies.

A further object of the present invention is to provide novel and improved means for permitting horizontal swivelling of a front axle assembly through the provision of interfacing and horizontally disposed plates in contrast to the usual king-pin, and by means of which a more mechanically satisfactory swivelling union may be obtained with simple and expeditious means for assembly and dismantlement.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings, in which—

Figure 1 is a plan view of my novel wagon or trailer gear.

Figure 2 is an enlarged fragmentary sectional elevation substantially on the line 2—2 of Figure 1.

Figure 3 is a section on the line 3—3 of Figure 1.

Figure 4 is an enlarged plan detail of my swivelling front wheel assembly.

In the drawings like characters of reference indicate corresponding parts in the different figures.

My wagon or trailer gear comprises in combination a reach 1 of elongated cylindrical or tubular configuration on which the rear wheel assembly collectively designated 2 is mounted. The front end of the reach 1 is rigidly secured to the front wheel assembly collectively designated 3 as I will describe in detail hereinafter.

Proceeding first to describe my rear wheel assembly, the same will be seen to consist of a wheel carrying axle beam 4, and superimposed above the beam in the vertical planes thereof is a box supporting bolster 5 having the usual stake holders 6 at the ends 7 thereof.

Positioned preferably between the beam 4 and the bolster 5 and secured at right angles to these members as by means of the hounds 7 is a sleeve 8 within which the reach 1 extends and from the foregoing, it will clearly be recognized that my rear wheel assembly may rotate vertically via the said sleeve about the said reach.

At spaced intervals upon the reach I provide apertures 9 into which nut and bolt assemblies may be inserted, the ends of said assemblies projecting whereby I am enabled to adjust the position of the sleeve 8 upon the length of the reach 1 and maintain the sleeve in fixed relation with respect to my front wheel assembly 3.

Having described my rear wheel assembly, I will now proceed to describe the front wheel assembly.

This comprises a wheel carrying axle beam 11 of the cross-section clearly illustrated, centrally upon the upper surface of which I secure, by welding or the like, a circular bearing plate 12. Lying upon the bearing plate 12 in co-axial interfacing and bearing contact therewith is what I define as a face plate 13, this face plate being secured as by welding or the like to a cradle 14.

The cradle 14 comprises a pair of spaced and parallel vertical walls 15 and a horizontal web portion 16, the front end of the breach 1 being secured as by welding or the like against the rear one of the two plates 15.

The space between the walls 15 provide a channel in which is positioned a bolster 17 which, in the accompanying Figure 2 is shown to be of box section and provided as per Figure 1 with the usual stake holders 18 at the ends thereof.

Secured centrally upon the underside of the bolster 17 is a segmental element 19 which may be of solid construction or may comprise, as illustrated in Figure 2, a pair of spaced side walls intended to lie within, parallel to and adjacent the walls 15, the perimeter of the segmental element obviously providing means whereby my bolster 17 may rotate to a limited extent vertically and independently of the axle beam 11. By particular reference to Figures 2 to 4 inclusive it will be seen that the bolster and segmental elements are prevented from becoming displaced with respect to the cradle 14 in which they move by the provision of a nut and bolt assembly 20 extending through aligned apertures in the walls 15, and through aligned apertures in the segmental walls of element 19, which former are sufficiently enlarged with respect to the shank of the said nut and bolt assembly to permit of the limited lateral movement which takes place upon the rolling action of the element as the bolster reciprocates vertically.

To maintain my plates 12 and 13 in axial alignment, I provide the retainers collectively designated 21 which are secured at spaced intervals upon the perimeter of the face plate 13. By the term perimeter, I include the surface area of the plate 13 which is adjacent to the axial perimetrical boundary line 22 thereof.

It will be seen that my retainers 21 are four in number, of which the two upon the forward side of the bolster 17 (in other words upon the side thereof upon which my draw-bar 23 is located) differ from the two upon the rear side of said bolster. Accordingly, for the purpose of further description, I hereby designate the former by the number 24, and the latter by the numeral 25. The retainers 24 are in fact horizontally disposed U-shaped configurations, and of one piece, while the retainers 25 are each formed of the two parts 26 and 27.

The parts 26 of the retainers 25 will be observed to be of what I term step-angulated configuration wherein the low-step or projecting portions 28 are provided with a pair of apertures to receive the nut and bolt assemblies 29. These nut and bolt assemblies secure the flat part 27 removably but securely to the portions 28, the part 27 projecting inwardly to overlap the perimeter of plate 12.

Thus it will be recognized that I have provided a conspicuously simplified means for maintained the plates 12 and 13 in concentric axial alignment, but in such a way that if and when desired, the axle beam 11 and the plate 12 secured thereto may quickly be removed from the remaining gear by detachment of the parts 27. Upon such detachment, it will be obvious that the plate 12 may readily be angled out of interfacing contact with plate 13, in the event for example that it is desired to provide a two-wheeled trailer.

Lastly I would explain that for purposes of lubrication I provide a conventional gland designated 30, the construction being particularly well suited for welded steel construction in conjunction with the aircraft type of tires illustrated.

Since various modifications can be made in my invention as hereinabove described and many apparently widely different embodiments of same made within the scope of the claims without departing from such spirit and scope, it is intended that all matter contained in the accompanying specification shall be interpreted as illustrative only and not in a limiting sense and I desire only such limitations placed thereon as are specifically expressed in the accompanying claims.

What I claim as my invention is:

1. A wagon or trailer gear characterized by the combination with a reach, of a swivelling front wheel assembly comprising a bolster secured at right angles to said reach, a non-rotatable face-plate horizontally secured to said bolster at the junction of said bolster and said reach, a wheel-carrying swivelling axle-beam, a bearing-plate secured for rotation therewith, the interfaces of said plates making mutual suface-contact, at least three spaced retainers secured to the perimeter of one of said plates and projecting therefrom, said retainers-as-a-whole being angulated to hook over the perimeter of the other plate and maintain said plates in mutual axial alignment, at least one of said retainers being of two-part construction, one of the parts being secured to one of said plates and projecting from the perimeter thereof, the other part being removably secured to the first part beyond the perimeter of the plate to which said first part is attached, said other part overlapping the perimeter of the other plate.

2. A wagon or trailer gear characterized by the combination with a reach, of a swivelling front wheel assembly comprising a bolster secured at right angles to said reach, a non-rotatable face-plate horizontally secured to said bolster at the junction of said bolster and said reach, a wheel-carrying swivelling axle-beam below said bolster, a bearing plate secured to said beam for rotation therewith, the interfaces of said plates making mutual surface contact, and at least three spaced retainers secured to the perimeter of one of said plates and projecting therefrom, said retainers-as-a-whole being angulated to hook over the perimeter of the other plate to maintain said plates in axial alignment, at least one of said retainers being comprised of two parts, one of said parts consisting of a step-angulated member and a retaining member, said members being removably interconnected at a point beyond the perimeter of said plates, said retaining member overlapping the perimeter of said other plate.

3. A wagon or trailer gear characterized by the combination with a reach, of a swivelling front wheel assembly comprising a bolster secured at right angles to said reach, a non-rotatable face-plate horizontally secured to said bolster at the junction of said bolster and said reach, a wheel-carrying swivelling axle-beam below said bolster, a bearing-plate secured to said beam for rotation therewith, the interfaces of said plates making mutual surface contact, and at least three spaced retainers secured to the perimeter of one of said plates and projecting therefrom, said retainers-as-a-whole being angulated to hook over the perimeter of the other plate to maintain said plates in axial alignment, at least one of said retainers-as-a-whole being angulated to hook over the perimeter of the other plate to maintain said plates in axial alignment and comprised of two parts, at least one of said parts being step-angulated, and the other flat, one of said parts being removably secured to the other beyond the perimeter of said other plate.

4. A wagon or trailer gear characterized by the combination with a reach, of a swivelling front wheel assembly comprising a bolster secured at right angles to said reach, a non-rotatable face-plate horizontally secured to said bolster at the junction of said bolster and said reach, a wheel-carrying swivelling axle-beam below said bolster, a bearing-plate secured to said beam for rotation therewith, the interfaces of said plates making mutual surface-contact, at least two horizontally disposed and substantially U-shaped retainers secured at spaced intervals to said face-plate and extending hookwise around the perimeter of said bearing-plate, and at least one two-part retainer also secured to said face-plate, one of said two-parts being step-angulated and projecting from said face-plate, the other part being removably secured to the projecting portion of said step-angulated part and extending inwardly therefrom to overlap the perimeter of said bearing-plate, said retainers being substantially equi-spaced, said U-shaped retainers being positioned upon the forward side of said bolster, said two-part retainer being secured upon the rear part of the perimeter thereof.

JOSEPH A. SCHAEFFER.

REFERENCES CITED

The following references are of record in the file of this patent:

UNITED STATES PATENTS

| Number | Name | Date |
|---|---|---|
| 847,647 | Calkins | Mar. 19, 1907 |
| 1,079,475 | Davis | Nov. 25, 1913 |
| 547,840 | Bunnell | Oct. 15, 1895 |
| 275,688 | Miller | Apr. 10, 1883 |
| 1,128,299 | Dietz | Feb. 16, 1915 |
| 224,531 | Hiekes | Feb. 17, 1880 |
| 339,395 | Farquhar | Apr. 6, 1886 |
| 775,316 | Simpson | Nov. 22, 1904 |

FOREIGN PATENTS

| Number | Country | Date |
|---|---|---|
| 6,013 | Norway | Jan. 31, 1898 |